United States Patent [19]
Frink et al.

[11] Patent Number: 6,141,691
[45] Date of Patent: Oct. 31, 2000

[54] APPARATUS AND METHOD FOR CONTROLLING TRANSFER OF DATA BETWEEN AND PROCESSING OF DATA BY INTERCONNECTED DATA PROCESSING ELEMENTS

[75] Inventors: Craig R. Frink, Chelmsford; Raymond D. Cacciatore, Westford, both of Mass.

[73] Assignee: Avid Technology, Inc., Tewksbury, Mass.

[21] Appl. No.: 09/054,920

[22] Filed: Apr. 3, 1998

[51] Int. Cl.[7] .................................................. G06F 15/16
[52] U.S. Cl. .......................... 709/233; 709/230; 709/232; 710/1
[58] Field of Search ................................... 709/233, 232, 709/230, 245, 231; 710/1

[56] References Cited

U.S. PATENT DOCUMENTS

| | | |
|---|---|---|
| 4,760,573 | 7/1988 | Calvignac et al. . |
| 5,222,102 | 6/1993 | Remson ..................................... 375/20 |
| 5,551,016 | 8/1996 | Loeb et al. ............................... 395/550 |
| 5,555,266 | 9/1996 | Buchholz et al. ...................... 370/95.1 |
| 5,651,001 | 7/1997 | Alvstad et al. .......................... 370/276 |
| 5,826,053 | 10/1998 | Witt ......................................... 395/386 |
| 5,847,779 | 12/1998 | Acampora et al. ................... 348/845.3 |
| 5,903,324 | 5/1999 | Lyons et al. .......................... 348/845.3 |

FOREIGN PATENT DOCUMENTS

| | | |
|---|---|---|
| 0 303 751 A1 | 2/1989 | European Pat. Off. . |
| 0 579 389 A1 | 1/1994 | European Pat. Off. . |
| 0 692 764 A1 | 1/1996 | European Pat. Off. . |
| 0 700 003 A2 | 3/1996 | European Pat. Off. . |
| WO 98/59494 | 12/1998 | WIPO . |

*Primary Examiner*—Zarni Maung
*Attorney, Agent, or Firm*—Wolf, Greenfield & Sacks, P.C.

[57] ABSTRACT

An interface enables asynchronous data processing elements to be interconnected using an interconnection protocol that controls the flow of data between the processing elements. The flow control allows the processing elements to be data independent, i.e., the processing elements need not be designed for a fixed sample rate or resolution, sample format, or other data dependent factors. When used with digital motion video data, the processing elements may process motion video data at various temporal and spatial resolutions and color formats and precisions. Flow of data between processing elements may be controlled by handshake signals indicating whether the data output by the sender is valid and whether the receiver can receive data. The sender transmits data and asserts a valid signal along with the data in response to a request signal from the receiver. The request signal may be asserted by the receiver and responded to asynchronously by the sender with the transmission of the data by the sender. As a result, the sender and receiver are decoupled, thus enabling high speed data transmission and time division multiplexing of data across the interconnect. The sender also may transfer command data. A valid command signal is to indicate the present of command data.

48 Claims, 14 Drawing Sheets

APPARATUS AND METHOD FOR CONTROLLING TRANSFER OF DATA BETWEEN AND PROCESSING OF DATA BY INTERCONNECTED DATA PROCESSING ELEMENTS

FIELD OF THE INVENTION

The present invention is related to apparatus and methods for controlling transfer and processing of data by interconnected data processing elements. The invention is more particularly related to the processing of temporally continuous media data, including motion video and audio data.

BACKGROUND

Analog motion video signals, such as those used in common television sets, video tape recorders and other analog video systems, are temporally continuous and synchronous signals requiring various elements in a video system to be synchronized in order to be used. In other words, analog motion video signals have a predetermined and fixed rate to which all of the elements in the video system are synchronized. Any element in the video system is designed with the assumption that there will be a constant rate for input and output of motion video information.

More recently, it has been possible to store digital motion video data in data files on a computer. There are several methods for playing back such motion video data. One method is called "pushing" or "streaming" of the motion video data. Streaming is based on an assumption that a system can provide an average data flow rate that is the same as the ultimate data flow rate needed to ensure temporally continuous output of analog motion video images to a viewer. Sufficient buffering is used to account for expected latencies in data transfer between elements. In some cases, both the temporal and spatial resolution of the motion video information may need to be reduced. Such systems typically are designed with the assumption that transfer of audio and video data from a source through several processing elements to its ultimate destination can neither be delayed nor stopped.

When a general purpose digital computer is used to process motion video information, a constant rate of flow of data generally cannot be maintained. There may be variations in data flow rates due to various latencies in the computer system due to, for example, disk or memory read latency, interrupts from other processing elements in the computer, etc. In addition, in some systems, such as editing systems, the ability to stop and restart playback is desirable. In order to overcome such problems, one method which has been used is to provide sufficient buffering in combination with an ability for data transfer to be stalled, such as shown in U.S. Pat. No. 5,045,940 (Peters, et al.) which is hereby incorporated by reference. These principles are used in a computer network as described in published European Patent Application No. 0674414A2. An extension of this combination to special effects processing is disclosed in PCT Publications WO94/24815 and WO95/26100 which are incorporated by reference. In this system, a data decompressor outputs data into a first buffer, from which it is transferred to a second buffer associated with a special effects processor. The first buffer indicates whether valid data is available. In addition, the special effects processor indicates to a controller associated with the decompressor whether it can receive data based on memory in the second buffer.

One drawback of these systems is that they use a significant amount of buffering to accommodate for delays in data transfer between elements. They also are generally designed for use with a single predetermined format of media. The data transfer protocol also may involve tightly coupled handshake signals between the sender and the receiver of data.

SUMMARY

An interface enables asynchronous data processing elements to be interconnected using an interconnection protocol that controls the flow of data between the processing elements. The flow control allows the processing elements to be data independent, i.e., the processing elements need not be designed for a fixed sample rate or resolution, sample format, or other data dependent factors. When used with digital motion video data, the processing elements may process motion video data at various temporal and spatial resolutions and color formats and precisions. Flow of data between processing elements may be controlled by handshake signals indicating whether the data output by the sender is valid and whether the receiver can receive data. The sender transmits data and asserts a valid data signal along with the data in response to a request signal from the receiver. The request signal may be asserted by the receiver and responded to asynchronously by the sender with the transmission of the data by the sender. As a result, the sender and receiver are decoupled, thus enabling high speed data transmission and time division multiplexing of data across the interconnect. The sender also may transfer command data. A valid command signal is used to indicate the presence of command data on the interconnect.

Accordingly, in one aspect, an output interface for a sender of data has an output for providing a datum and a boundary signal indicating whether the datum defines a boundary of a sample of the data and a valid data signal associated with a datum and indicating whether the associated datum is valid. An input provides a request signal from a receiver indicating a request for transfer of data from the sender. A controller, after receipt of the request signal, directs data to the output and that asserts the valid data signal in association with the datum.

In another aspect an output interface for a sender of data has an output for providing a datum and a boundary signal indicating whether the datum defines a boundary of a sample of the data and a valid data signal associated with data and indicating whether the associated data is valid and a valid command signal associated with a command data and indicating whether the associated command data is valid command data. An input provides a request signal from a receiver indicating a request for transfer of data from the sender. A controller transfers data with one of the valid data signal and the valid command signal asserted when a request signal is received.

In one embodiment, the output further provides a reference clock signal and the data is output by the output interface at a rate defined by the reference clock. The output may have data lines for carrying the datum, a boundary signal line for carrying the boundary signal, and a valid data signal line for carrying the valid data signal. The input may include a request signal line for carrying the request signal.

In another embodiment, the output includes a valid command signal associated with a datum and indicating whether the associated datum is valid command data. The controller, after receipt of the request signal, directs command data to the output and asserts the valid command signal in association with the datum. The output interface also may encode packets of data using a combined state of the valid data signal and the valid command signal.

In another embodiment, the output interface may have a phase-lock loop having an input for receiving the reference clock and an output providing a clock signal having a rate higher than a rate of the reference clock. The rate defined by the reference clock for receiving data is the rate defined by the output of the phase-lock loop. When the rate of the output of the phase-lock loop is a non-integer multiple of the rate of the reference clock, the output interface synchronizes the phase-lock loop with a phase-lock loop in an input interface receiving the data from the output interface. Time division multiplexing of data onto the output interface at the rate of the output of the phase-lock loop may be performed.

In another embodiment the output interface may include a counting circuit having a first input for receiving a value to be loaded to provide an output, wherein the output indicates a number of samples of the processed data for which the command data is valid, and control logic for tracking a number of samples processed by the processing element and for generating the control signal to the processing element after the processing element outputs the last sample for which the command data is valid.

In another aspect, an input interface for a receiver of data has an input for receiving from a sender a datum and a boundary signal indicating whether the datum defines a boundary of a sample of the data and a valid data signal associated with a datum and indicating whether the associated datum is valid. An output provides a request signal indicating a request for transfer of data from the sender. A controller issues the request signal when the input interface is capable of receiving data and reads the datum from the input when the valid data signal in asserted.

In another aspect, an input interface for a receiver of data, has an input for receiving from a sender data and a boundary signal indicating whether the data defines a boundary of a sample of the data and a valid data signal associated with the data and indicating whether the data is valid and a valid command signal associated with the data and indicating whether the data is valid command data. An output provides a request signal indicating a request for transfer of data from the sender. A controller issues the request signal when the input interface is capable of receiving data and reads the datum from the input when one of the valid data signal and the valid command signal is asserted.

In one embodiment, the input further receives a reference clock signal and the data is read by the controller at a rate defined by the reference clock. The input may include data lines for carrying the datum, a boundary signal line for carrying the boundary signal, and a valid data signal output line for carrying the valid data signal. The output may include a request signal line for carrying the request signal.

In one embodiment, the input further receives a valid command signal associated with a datum and indicating whether the associated datum is valid command data. The controller issues the request signal when the input interface is capable of receiving data and reads the command data from the input when the valid command signal in asserted. The input interface also may decode packets defined by a combined state of the valid data signal and the valid command signal.

In one embodiment, the input interface further includes a phase-lock loop having an input for receiving the reference clock and an output providing a clock signal having a rate higher than a rate of the reference clock. The rate defined by the reference clock for reading data is the rate defined by the output of the phase-lock loop. When the rate of the output of the phase-lock loop is a non-integer multiple of the rate of the reference clock, the input interface synchronizes the phase-lock loop with a phase-lock loop in an output interface of the sender providing the data to the input interface. The input interface also may demultiplex time division multiplexed data on the input interface using the output of the phase-lock loop.

In another embodiment, the input interface further includes a counting circuit having a first input for receiving a value to be loaded to provide an output, wherein the output indicates a number of samples of the processed data for which the command data is valid, and control logic for tracking a number of samples processed by the processing element and for generating the control signal to the processing element after the processing element outputs the last sample for which the command data is valid.

In other aspects, an integrated circuit for processing data, particularly video data, may contain an input interface or output interface as described above. Another aspect is a system of devices interconnected using input and output interfaces as described above. Another aspect is a process performed by an output interface and its various embodiments, by which data is transferred in response to a request signal. Another aspect is the process performed by the input interface and its various embodiments, by which data is captured when an asserted valid data signal or valid command signal is received. It should be understood that the various combinations of these embodiments are aspects of the invention.

DETAILED DESCRIPTION

An asynchronous data interface interconnects processing elements in a manner which allows the processing elements to be data independent. For example, for digital motion video data the interconnect allows for format independence, temporal and spatial resolution independence, frame rate independence and variability, and faster than real-time transfer of compressed or uncompressed digital motion video data between processing elements. In general, the interface allows processing elements to treat media as computed data rather than temporally continuous data. Because of the data independence of both the interconnect and the processing performed by interconnected processing elements, different formats of data and different media types may be multiplexed with different bandwidths across the same interconnect. An assumption that motion video data and audio data cannot be burst across an interconnect may be eliminated. Motion video data therefore can be processed with processing elements that allow for multiple temporal and spatial resolutions, color and pixel representations and resolutions, full motion and less than full motion video, broadcast quality and less than broadcast quality video data, and multiplexing of two or more data streams including video data, key data, other kinds of data and commands over the same interconnect.

Figure 1:
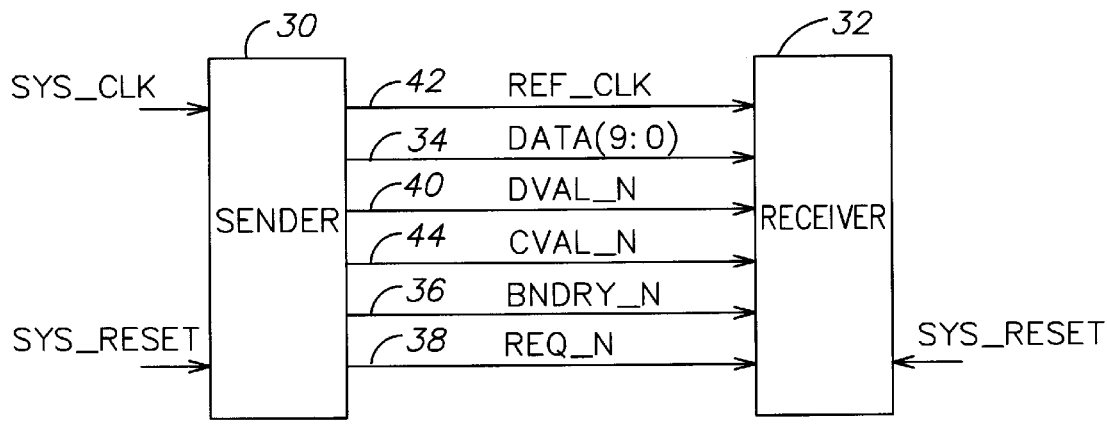
FIG. 1 is an illustration of signals connecting two asynchronous video processing elements in an interface in one embodiment.

FIG. 1 illustrates an interface between a sender and a receiver of data. The sender and the receiver may be implemented as separate integrated circuits or by separate discrete devices. A sender 30 is connected to a receiver 32 through a data interconnect 34 that carries data (DATA(9:0)) between devices. Although this embodiment is described in connection with 10-bit video data, other kinds of data and data precisions may be used. Such data includes, but is not limited to, video data, key data, audio data, command or other data. The data type either may be agreed upon either by convention or by signals labeled in the data stream, or may be specified by command data. The interface is unidirectional, but the direction may be selectable under appropriate software and/or hardware control.

Data from a sender on this video data interface may be relative to an edge, e.g., the rising edge, the falling edge or both, of the interface clock (CLK), e.g., a twenty-seven megahertz (27 MHZ) clock provided on a signal line 42. The interface clock may be established either by an external source or by the sender, e.g., when source synchronous clocking is used to transmit data over long distances. Data from a receiver (e.g., a REQ_N signal) is asynchronous to the reference clock, unless the reference clock is used for timing of time-division multiplexing, as described below.

The precision, in bits, of the data interconnect 34 of the interface depends on the application. For example, motion video data may use 8-bit, 10-bit, 12-bit and 16-bit and other precision data paths. In such an embodiment, the interface may be a single video component in width, according to an appropriate video format convention. For example, chroma and luma samples alternating on successive clocks following a 4:2:2 convention (CCIR601) may be supported. Other example formats include, but are not limited to, RGB, 4:4:4, RGBA, 4×4 and 4:2:2:4. In general, the interface is format independent so long as the sender and receiver agree to or specify the selected format. When a 10-bit interface is used for 8-bit video data, the least significant bits (DATA 1:0) may be left undefined, or may be defined by convention in an application. For example, for SMPTE-compliant data, these least significant bits should be set to zero. 10-bit data also may be sent over an 8-bit interconnect using a data packing protocol described in U.S. Patent Application entitled "Video Data Storage and Transmission Formats and Apparatus and Methods for Processing Video Data in Such Formats," filed Apr. 3, 1998, by Craig R. Frink, Raymond D. Cacciatore and Hamed Eshraghian, which is hereby incorporated by reference.

The flow of data from the sender 30 to the receiver 32 across the data interconnect 34 may be controlled using two handshake signals. The first handshake signal is a request signal (REQ_N) sent across a signal line 38 from the receiver. The request signal is generated by the receiver to indicate its ability to accept new data, which also allows the receiver to pace the flow of data. The request signal also may be asserted by the receiver independent of the second handshake signal, called the valid data signal. The valid data signal (DVAL_N) is sent over a signal line 40 from the sender. The valid data signal is associated with a datum at the sender and indicates whether the associated datum is available to be transferred. The valid data signal may be asserted by the sender in response to the request signal. The sender uses the valid data signal to control the flow of information to the receiver.

A boundary signal (BNDRY_N), sent by the sender across a signal line 36 with the data to the receiver, represents auxiliary information about the data transferred across the interface. This boundary signal signifies at least the boundary of data for a given sample, which is defined by convention for an application between a sender and receiver. For example, for motion video data the boundary signal may designate an image boundary, or another boundary such as a line or pixel or video datum such as a component. When used to designate an image boundary, this signal may be asserted at the same time the data for the last component of either a pixel in the image or a key is on the data interconnect 34 in order to indicate the end of the image. The start of data for a sample, such as an image, may be signaled instead of the end. The boundary signal also may be encoded such that a transition in the signal designates an end of field and the state of the signal on the first component of the field indicates the sense, i.e., odd or even, of the field. The auxiliary information also may indicate the presence of data of a particular type or command data. The boundary signal is asserted with the same timing as the data on the data interconnect 34 and follows the same flow control behavior as the data. It may be valid when the valid data signal is asserted.

A valid command signal (CVAL_N) also may be sent by the sender across a signal line 44. The valid command signal indicates the presence of command data on the interface. Similar to the valid data signal, the valid command signal is associated with a datum at the sender and indicates whether the associated datum is valid. The valid command signal may be asserted by the sender in response to the request signal. In one embodiment, the valid command signal may be asserted independent of the request signal. In that embodiment, the receiver has a buffer for receiving the command data. The sender uses the valid command signal to control the flow of command data to the receiver.

Another way to provide command data to a device is by loading control registers through another interface. A counting circuit may be used to specify the number of data samples to which the command data is valid. This counting circuit may be decremented by a boundary signal in the interconnect. Pre-roll and post-roll operations may be performed using a similar counter. Such a counter is described in U.S. patent application Ser. No. 08/879,981, entitled "Apparatus and Method for Controlling Transfer of Data Between and Processing of Data by Interconnect Data Processing Elements," by Jeffrey D. Kurtze et al., which is hereby incorporated by reference.

Timing diagrams illustrating the flow of data across the connection will now be described. The interconnect supports both constant flow and controlled flow connection protocols over the interconnect. In a controlled flow application, the handshaking signals (the valid data signal, valid command signal and the request signal) are used to manage the flow of data. Either the sender or the receiver can control the flow. A constant flow application is one in which the flow of data is generally not stopped, for example, for a connection to a video camera or a video playback device. In the constant flow mode of operation, the request signal does not have the same significance, insofar as the request signal is considered asserted. However, the valid data signal is still used to indicate valid data on the interconnect. For example, the valid data signal may correspond to the active video portion of a video signal when transmitting video data.

In controlled flow operation, the receiver indicates its ability to accept data by asserting the request signal. The request signal may be considered a stop signal. When the request signal is not asserted, the signal indicates that the sender should stop sending data to the receiver. The sender asserts either the valid data signal or valid command signal coincident with the data in response to the request from the receiver. This protocol permits variable length delays between the assertion of the request signal by the receiver and the receipt by the receiver of the valid data signal or valid command signal from the sender. This delay decouples the sender and receiver, allowing controlled flow of data over large distances without complex timing considerations and with high performance. In this protocol, the valid data signal or valid command signal and accompanying data are forwarded in response to a request signal. The sender considers a request signal a "permission to send" signal and an indication of the ability of the receiver to accept new data. The receiver uses the valid data signal and the valid command signal to qualify the data on the interconnect. Data not captured by the receiver when either the valid data signal or the valid command signal is present results in loss of the data. The signal timing, as discussed above, is controlled by the reference clock.

In constant flow connections, the receiver guarantees that it captures valid data when present on the interconnect. The sender assumes that the request signal from the receiver is asserted. In these connections, the sender asserts the valid data signal for data to be captured at the receiver. A clock period of the reference signal might not correspond to valid data, and thus the valid signal sometimes is not asserted.

In this example and in those to follow, the request signal (REQ_N), the valid data signal (DVAL_N), the valid command signal (CVAL_N) and the boundary signal (BNDRY_N) are negative logic signals.

Figure 2A:
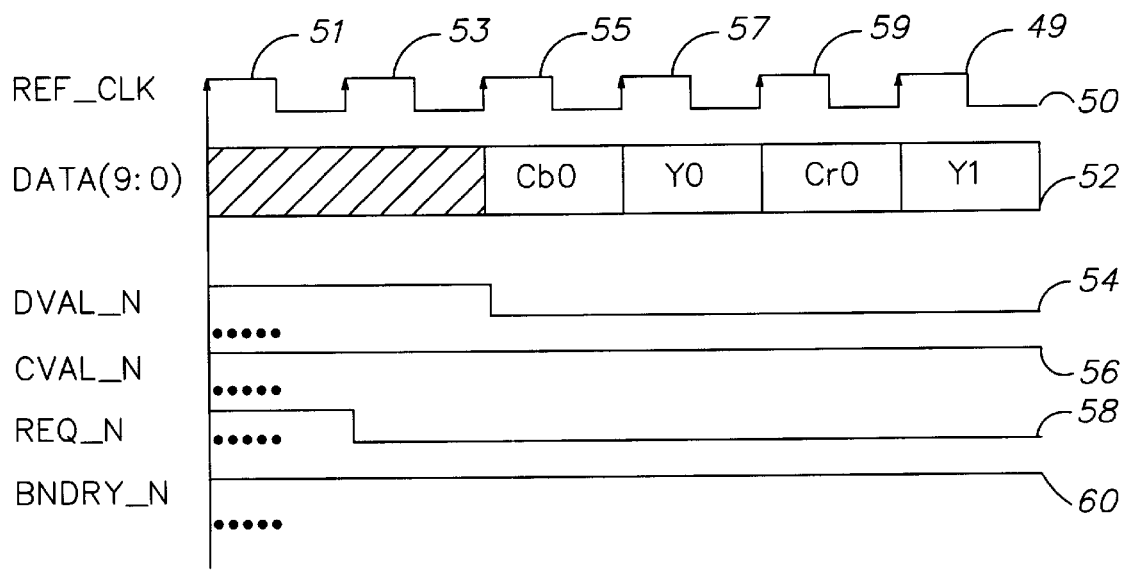
FIGS. 2A–2G are timing diagrams illustrating the relationship of signals on the interface of FIG. 1.

Referring now to FIG. 2A, a simple data transfer example will now be described. In FIG. 2A, a clock signal 50 represents the interface clock applied to the clock inputs of the sender and receiver. Data are shown at 52. The valid data signal is shown at 54 and the valid command signal is shown at 56. The request signal is shown at 58. The boundary signal is shown at 60. The boundary signal 60 and a valid command signal 56 are shown unasserted for simplicity of illustration. The request data signal 58 is shown asserted in clock cycle 53. In response, in the next clock cycle 55, the sender asserts the valid data signal 54 and outputs valid data 52. As shown in this example, the request signal indicates whether the receiver is able to accept data from the data interconnect. The sender outputs valid data and asserts the valid data signal after receipt of a request signal. There may be a one or more clock cycle delay between the receipt of a request signal and the output of a valid data signal. Data is read from the data interconnect by the receiver when the valid data signal is asserted. The request signal might not be asserted at the receiver when valid data is ultimately received.

An alternative embodiment is shown in U.S. patent application Ser. No. 08/879,981, in which data is transferred when the request signal and valid data signal are asserted during the same clock cycle. Another embodiment is shown in U.S. Patent Application entitled "A Packet Protocol for Encoding and Decoding Video Data and Data Flow Signals and Devices for Implementing the Packet Protocol," filed Apr. 3, 1998, by Craig R. Frink and Andrew V. Hoar, which is hereby incorporated by reference, in which packets of data are transmitted and a receiver transmits a request packet indicating an amount of data.

Figure 2B:
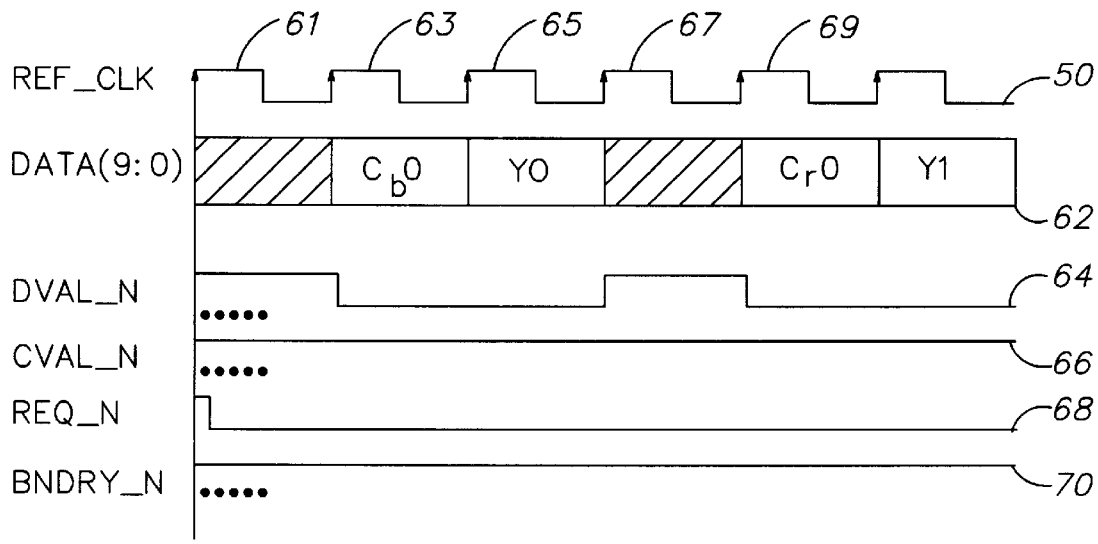

FIG. 2B is a timing diagram illustrating control of the flow of data by the sender using the valid data signal. The sender uses the valid data signal to indicate valid video or key data that is available to be read by the receiver from the interface. The data is valid when the valid data signal is present and the data is lost unless the receiver accepts the data during the clock cycle. The sender negates the valid data signal when valid data is not present on the interconnect. To simplify illustration, the boundary signal 70 and the valid command signal 66 are shown unasserted. The valid data signal 64 is asserted for clock cycle 63, 65 and after clock cycle 69. Accordingly, valid data is present at the video data interconnect only when the valid data signal is asserted (cycles 63, 65 and 69+). In this example, it is assumed that the request signal becomes asserted in clock cycle 61 such that the sender now may start sending data in the clock cycle 63. Accordingly, the receiver receives data in clock cycle 63, 65 and 69+ of the reference clock. This timing diagram is typical of the controlled flow operation embodiment. In another embodiment, described in U.S. Patent Application entitled "Method and Apparatus for Controlling Data Flow Between Devices Connected by a Memory," filed Apr. 3, 1998, by Craig R. Frink, which is hereby incorporated by reference, the sender indicates to the receiver an amount of valid data which is available in a memory.

Figure 2C:
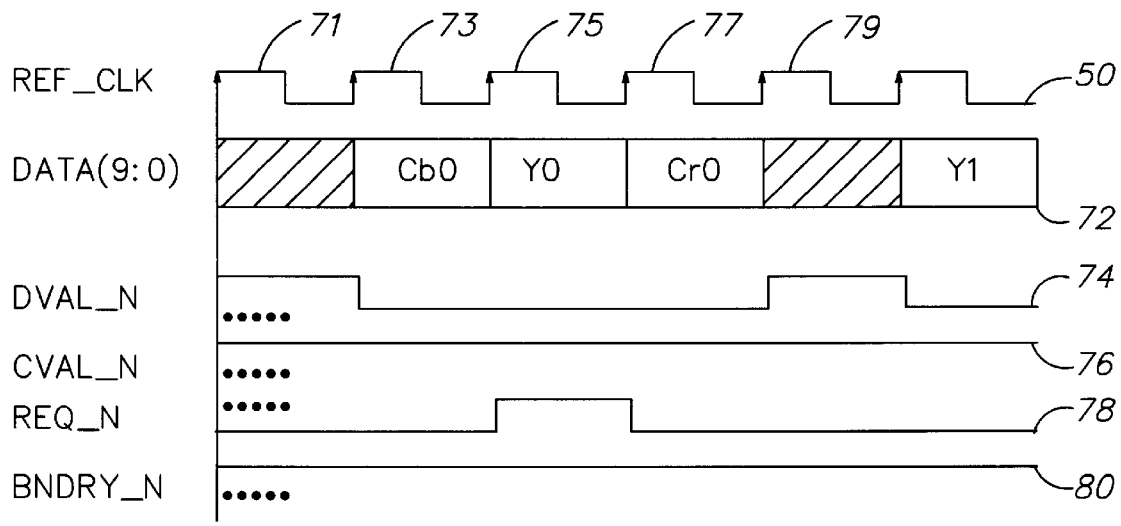

A timing diagram illustrating control of data transfer by the receiver using the request signal will now be described in connection with FIG. 2C. The request signal indicates whether the receiver is able to receive data from the data interconnect. Data is read from the data interconnect by the receiver when the valid data signal is asserted during a cycle of the interface clock. It is possible for the request signal not to be asserted when the valid data signal is asserted. Nonetheless, the receiver still reads data from the data interconnect. In the timing diagram in FIG. 2C, a clock signal 50 represents the interface clock applied to the clock inputs of the sender and receiver. Data are shown at 72. The boundary signal 80 and the valid command signal 76 are shown not asserted for simplicity. The valid data signal 74 is asserted only when valid data is on the interconnect. The request signal 78 is initially asserted, then is not asserted for one clock cycle 75, then is asserted for the remaining clock cycles. When the request signal is not asserted in any clock cycle, e.g., clock cycle 75, in the subsequent clock cycle, e.g., clock cycle 79, the data 72 on the data interconnect is indicated as invalid by deasserting the valid data signal 74. In this example, a two clock cycle delay when stalling the flow of data from the sender indicates that the receiver buffers additional data after it deasserts the request signal.

Figure 2D:
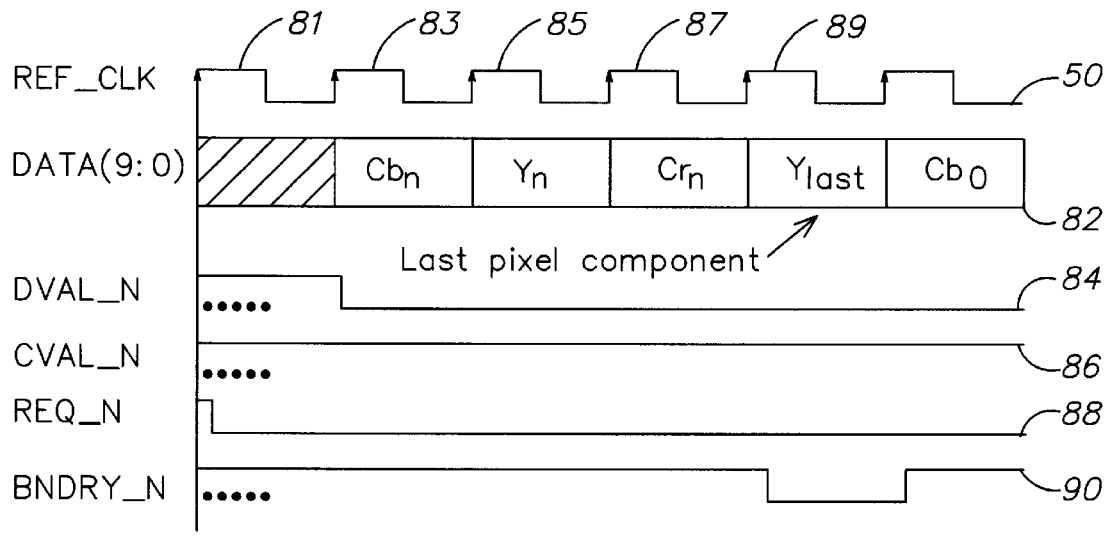
Figure 2E:
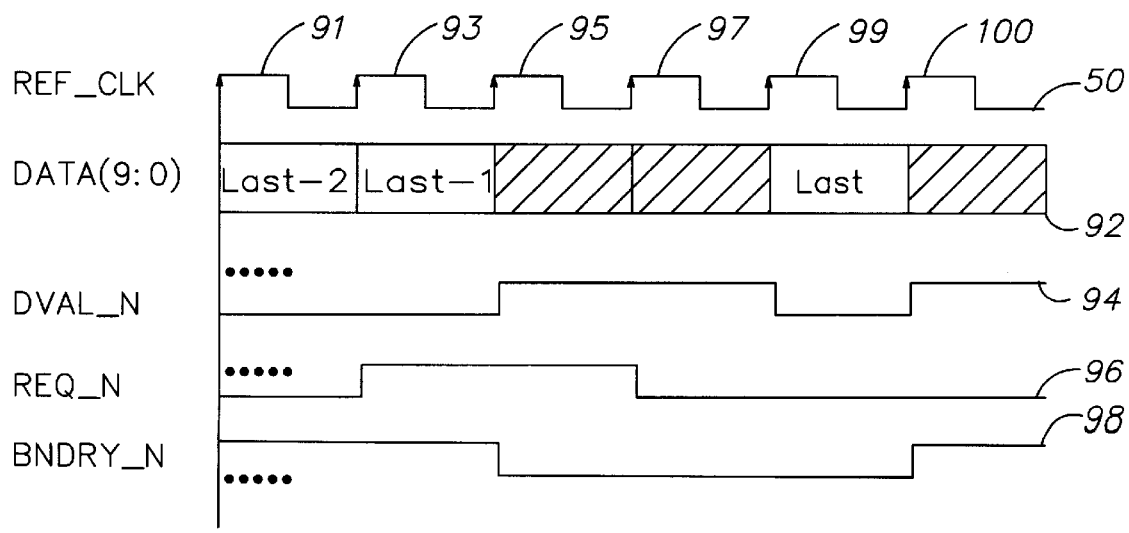

FIGS. 2D and 2E are timing diagrams representing how the boundary signal is used to indicate the last component of a sample. The boundary signal may represent, for example, a field boundary called a vertical synchronization signal in a synchronous video system, or other boundary, such as a frame or line of data. The boundary signal is asserted in conjunction with the last component in a video or key sample. It also may be used simply to delineate command data. It is asserted with the same timing as the video data and follows the same flow control behavior as the video data, but its relative position with respect to the data is application dependent. In FIG. 2D, the data on the interconnect is illustrated at 82. Both the valid data signal 84 and the request signal 88 are asserted. The valid command signal 86 is shown unasserted for simplicity of illustration. As indicated at 90, at the fifth clock cycle 89, the data on the data interconnect is a component "$y_{LAST}$" and is the last pixel component of the last pixel of a field or frame. The pixel data on the interconnect 82 is concurrent with the boundary signal on the interconnect.

Referring now to FIG. 2E, if the request signal 96 is deasserted and recognized by the sender at the time when the boundary signal 98 is asserted, the boundary signal remains valid until the valid data signal is asserted as shown at 94. In this example, in clock cycle 93 the request signal is deasserted. Accordingly, in clock cycle 95, the valid data signal is deasserted, and the boundary signal becomes asserted. In clock cycle 97, the request signal again becomes asserted and the valid data signal becomes asserted in clock cycle 99 to output the last or boundary component. In clock cycle 100, the valid data signal and the boundary signal 98 are deasserted.

Figure 2F:
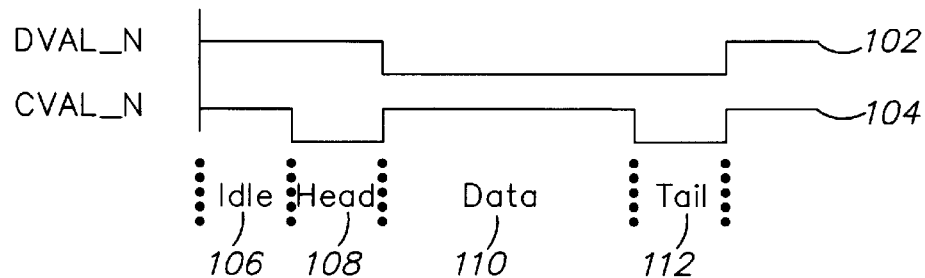

A use of the valid command signal will now be described in connection with FIGS. 2F and 2G. The valid command signal indicates the presence of command data on the interface. Command data may be used to specify processing parameters, switching state, addresses or other information to a receiver. The use of this signal in combination with the valid data signal can indicate four states of the interconnect. Referring to FIG. 2F, the combination of the valid data signal and the valid command signal may be used to indicate the presence of the packet of data on the interconnect. In particular, in one embodiment, the valid data signal 102 when paired with the valid command signal 104 may indicate an idle state 106, a header 108 of a packet, packet data 110, and a packet tail 112. The valid command signal also may observe the same protocol as the valid data signal. When the valid command signal is asserted, the receiver accepts data. When the receiver deasserts the request signal, the sender similarly deasserts the valid command signal as soon as possible. Note that in FIG. 2F, where the valid data and valid command signals are used in combination, the receiver receives the packet header, packet data and packet tail. The valid command signal also may be used in an interface as described in U.S. patent application Ser. No. 08/879,981.

Figure 2G:
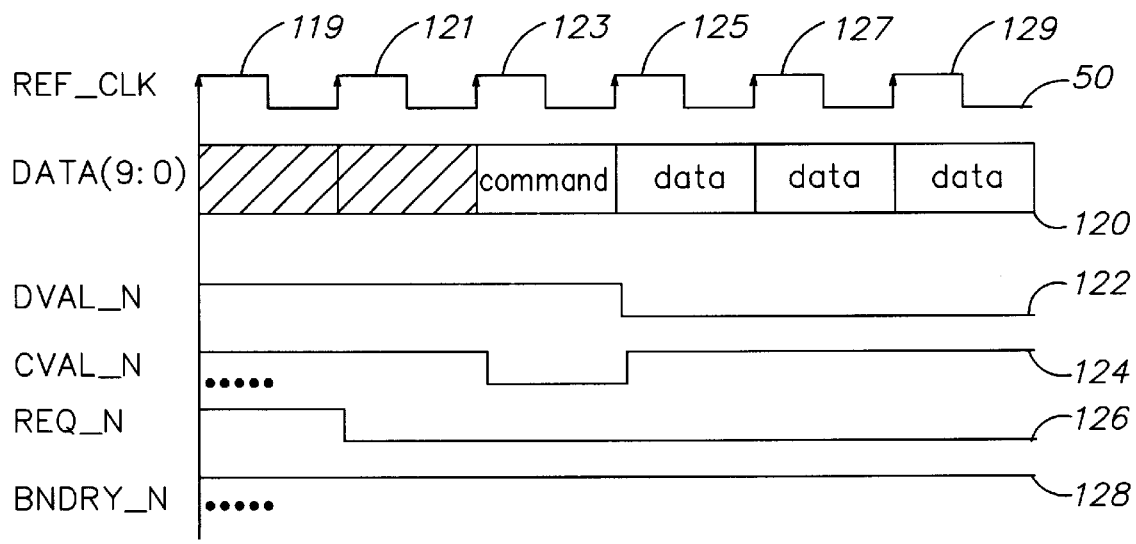

Referring to FIG. 2G, the boundary signal 128 is shown unasserted for simplicity. In this example, the request signal 126 is asserted in clock cycle 121. In clock cycle 123, command data is available on the data interconnect 120 and the valid command signal 124 becomes asserted. In clock cycle 125, the valid data signal 122 is asserted, the valid command signal is deasserted and data is now available on the interconnect 120. As an alternative, the valid command signal, when asserted alone such as shown at 123 in FIG. 2G, may be used to indicate the presence of valid command data on the interconnect.

Figure 3A:
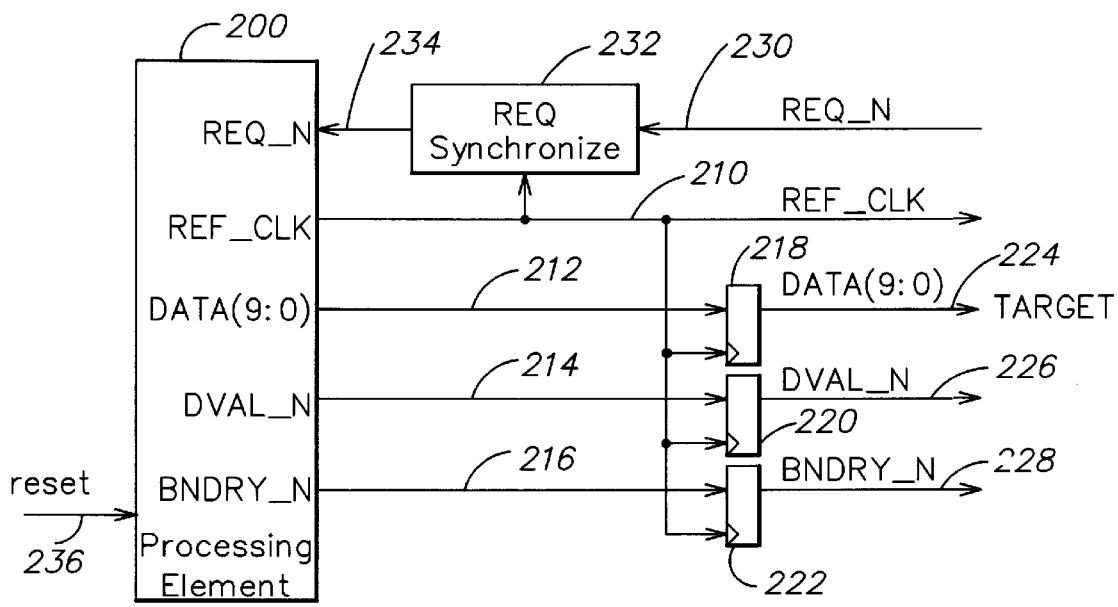
FIGS. 3A–3C are block diagrams of three embodiments of a processing element having an output providing the signals described in FIG. 1 and FIGS. 2A–2G.
Figure 3B:
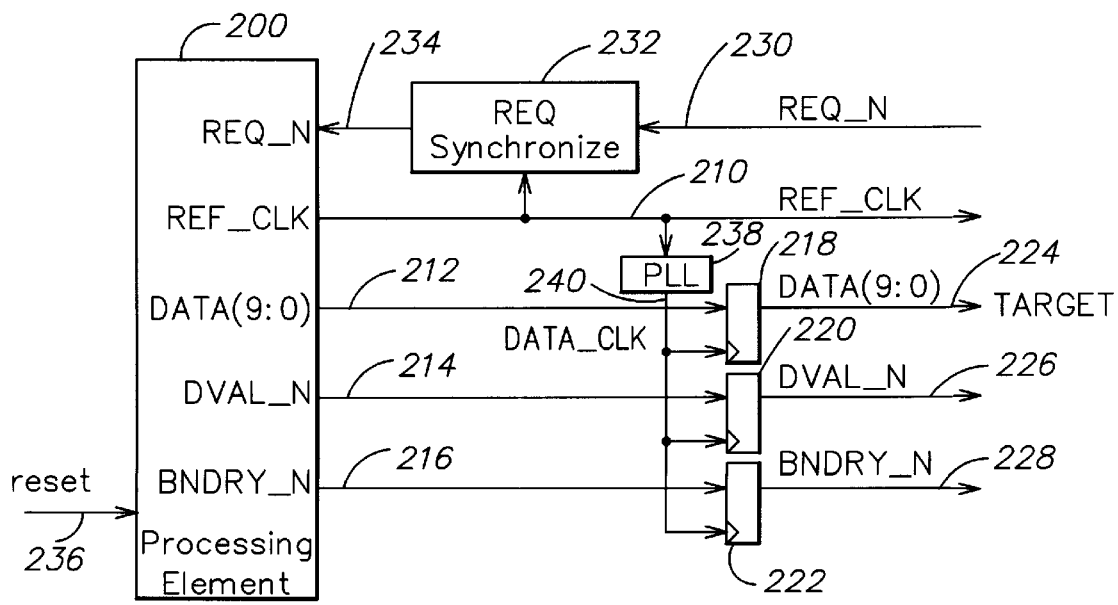
Figure 3C:
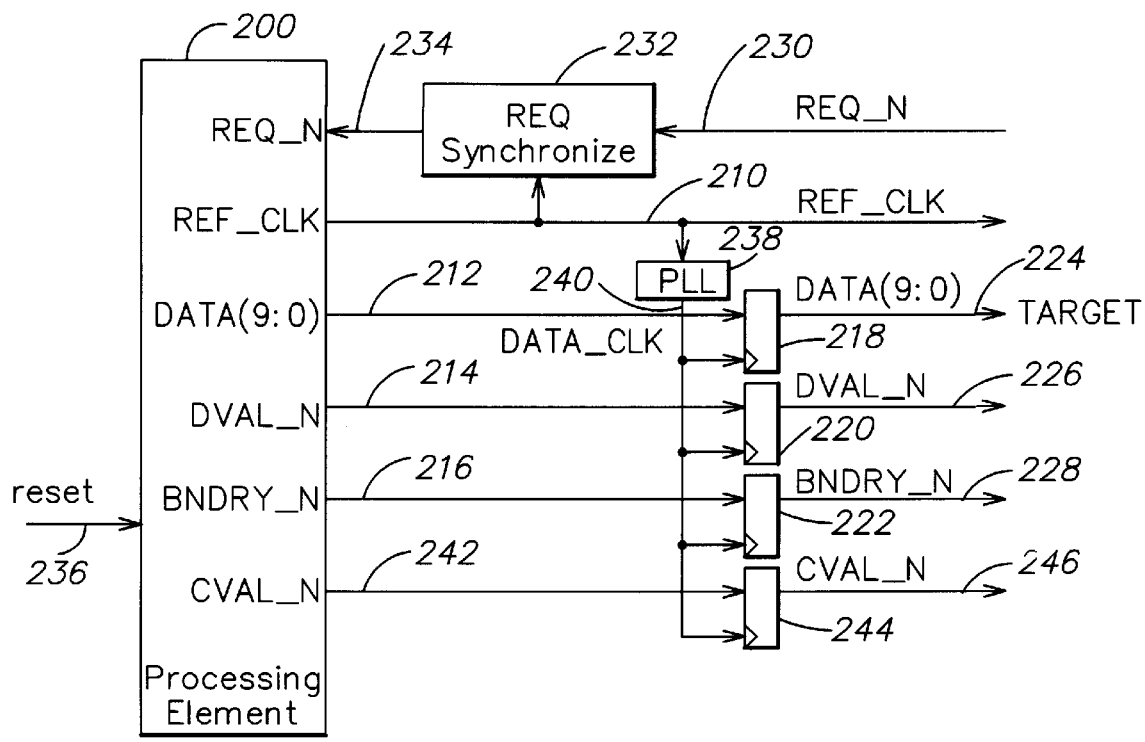

FIGS. 3A through 3C illustrate different embodiments of a sender device having an interconnect in accordance with the protocol described above. In general, the sender has a processing element 200 which provides the reference clock 210 as well as data 212, valid data signal 214, and boundary signal 216. The data, valid data signal and boundary signal are provided to their own latches 218, 220 and 222 which are synchronized to the reference clock 210. The output of latch 218 provides the output data 224. The output of latch 220 provides the output valid data signal 226. The output of latch 222 provides the output boundary signal 228. The request signal 230 received by the sender is synchronized using a synchronization circuit 232 to the reference clock 210. The synchronized request signal 234 is received by the processing element 200. The processing element also has a reset input 236 to be described in more detail below. In this embodiment, the valid command signal is not present and data is transmitted at the rate of the reference clock. The registers 218, 220 and 222 may be replaced by a first-in/first-out memory or other storage device. In one embodiment, the reference clock is a 27 MHz clock which allows a standard SDTV 4:2:2 video stream to be transmitted.

It is possible to transmit higher bandwidth data streams while maintaining a reference clock at a lower frequency by using a phase-lock loop (PLL) at both the sender and receiver ends of the interface. An embodiment of a sender having a PLL is shown in FIG. 3B. This circuit has a phase-lock loop (PLL) 238 of which the output signal 240 is used to drive latches 218, 220 and 222. The phase-lock loop outputs a signal which is a multiple of the reference clock. This signal is a high speed data clock that synchronizes the data at either end of the interface. The base frequency is transmitted over the interconnect as the reference clock to be used as a phase-lock loop reference at the receiver. There are several instances where this type of clock would be useful. For example, if the reference clock is 74.25 MHz, the phase-lock loops may allow data transmission at a rate of 148.5 megabytes per second, allowing transmission of an HDTV stream. A 4:4:4:4 data stream may be transmitted at 54 MHz with the reference clock at 27 MHz. In another embodiment, the reference clock may have a frequency of 27 MHz and the phase-lock loop may be run at five and a half times the reference clock frequency, to produce a data rate of 148.5 MHz. In this embodiment, the system runs at the standard SDTV clock rate, but allows transmission of real-time HDTV streams between elements. In another embodiment, the phase-lock loops may be run at an integer multiple of a 27 MHz reference clock. If this multiple is six times or greater then there is sufficient bandwidth to transmit both HDTV data and SDTV data.

Figure 6:
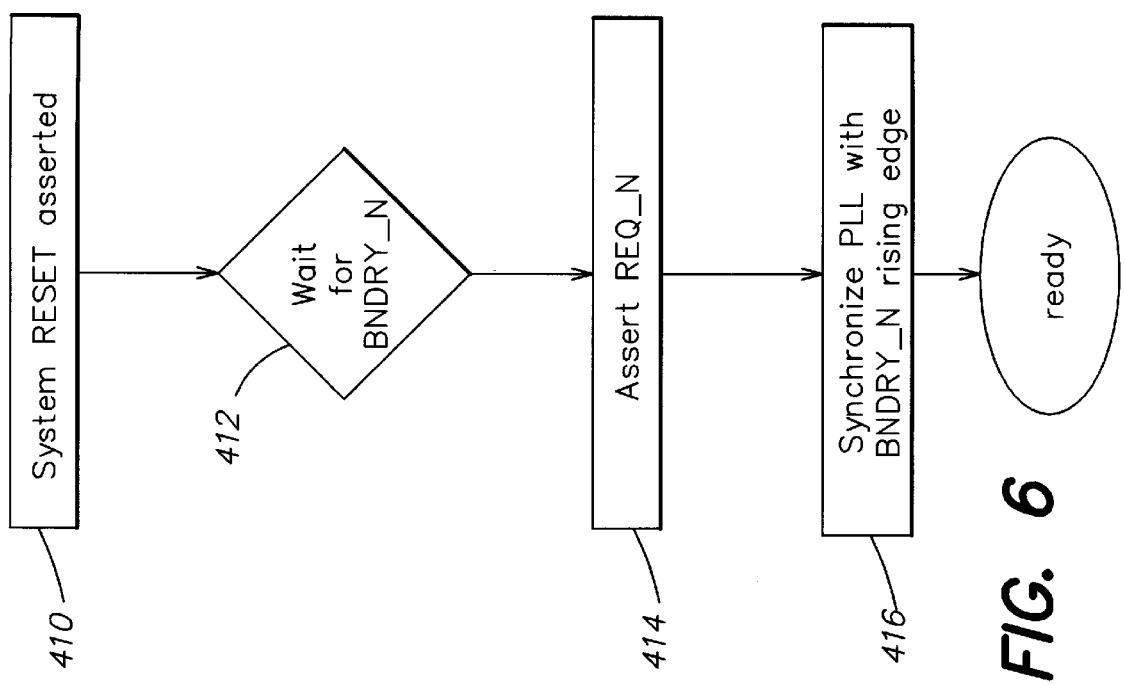
FIG. 6 is a flow chart describing how a phase-lock loop at a receiver is synchronized with a phase-lock loop at a sender.
Figure 5:
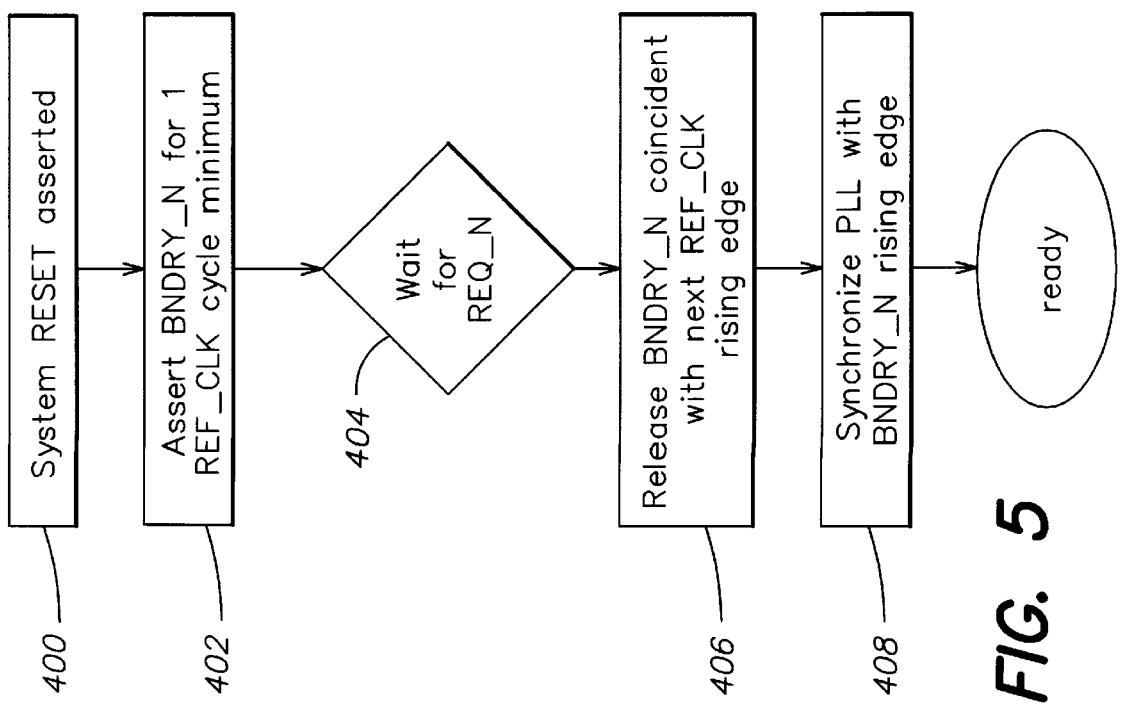
FIG. 5 is flow chart describing how a phase-lock loop at a sender is synchronized with a phase-lock loop at a receiver.

One problem that may occur when using phase-lock loops and non-integer divide ratios (e.g., 5.5), such as shown in FIG. 3B, is that there may be a misalignment of clocks between the sender and the receiver. A process for aligning these clocks upon reset of the processing elements will be described in more detail below in connection with FIGS. 5 and 6.

FIG. 3C illustrates the interface of FIG. 3B with an additional valid command signal. The valid command signal 242 is output by the processing element which is then latched by register 244 under control of the data clock signal 240 from the phase-lock loop 238. Alternatively, latch 244 may be added to the circuit shown in FIG. 3A and controlled by the reference clock along with the other latches in FIG. 3A. The output of latch 244 provides the valid command signal 246.

Figure 3D:
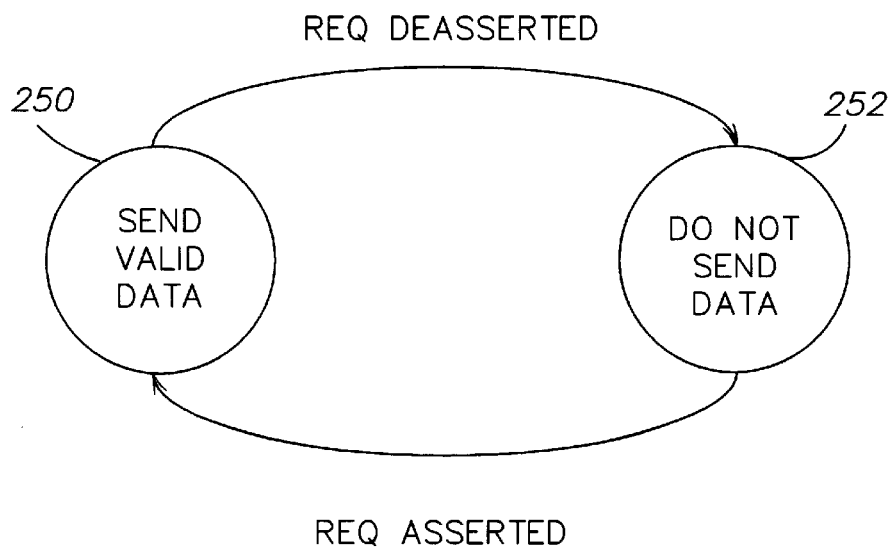
FIG. 3D is a state diagram of a flow control process performed by a sender of data.

FIG. 3D illustrates a state diagram for use by the processing element 200 in any of FIGS. 3A–3C. This state diagram has a first state 250 in which valid data is sent and a second state 252 in which no data is sent. In the first state 250, if data is available by the processing element, the data is made available on output 212 and the valid data signal is asserted simultaneously on output 214. In the next clock cycle, the signals are available on the interconnect. In state 252, the valid data signal 214 is deasserted. In state 252, if the request signal 234 becomes asserted, a transition is made to state 250. In state 250, if the request signal 234 is deasserted, a transition back to state 252 occurs.

Figure 4A:
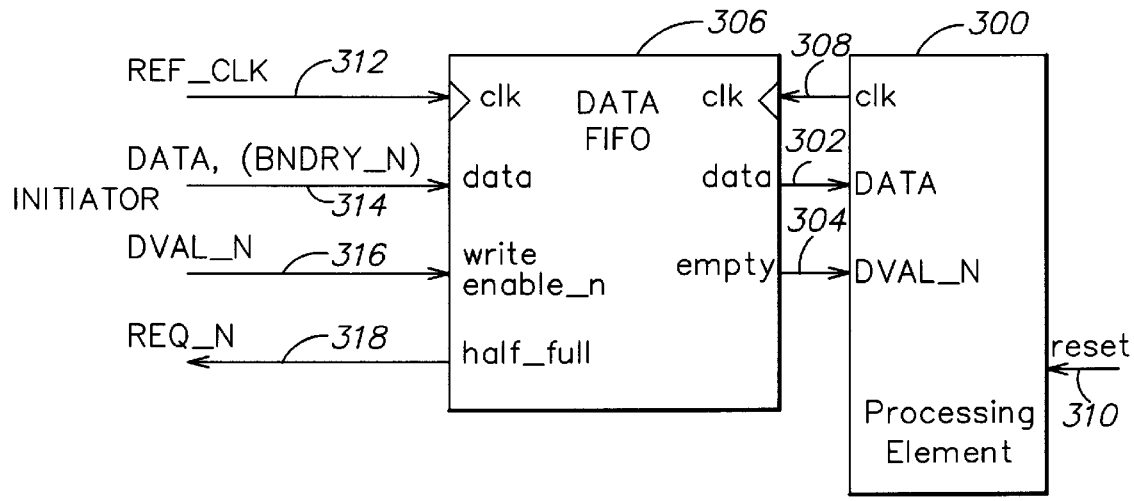
FIGS. 4A–4D are block diagrams of three embodiments of processing elements having inputs corresponding to the signals shown in FIG. 1 and FIGS. 2A–2G.

Referring now to FIGS. 4A through 4D, embodiments of a receiver will now be described. FIG. 4A illustrates a receiver without a valid command signal. The receiver has a processing element 300 which receives data through a data line 302 and a valid data signal 304 from a data FIFO 306. It is possible to use a large memory in the place of the FIFO. The processing element 300 provides a clock signal 308 to the data FIFO to read data therefrom. The processing element 300 also uses a reset signal 310 as described below. The data FIFO 306 receives a reference clock 312 from the sender which is applied to a clock input to enable writing of data into the data FIFO 306. The data 314 from the interconnection is applied to data inputs of the data FIFO 306. The device shown in FIG. 4A also may input the boundary signal to data FIFO to permit the receiver to maintain the association of the boundary signal with the corresponding data. The valid data signal is applied to a write enable input of the data FIFO 306. A half full or other state indication of the FIFO 306 is provided as the request signal as indicated at 318.

The clocked FIFO 306 captures data in response to the clock signal when the valid data signal 316 is present. New data continues to flow into the FIFO as long as the processing element 300 at the receiver continues to read data from the FIFO through data line 302 at a rate equal to or greater than the capture rate. When the processing element stops reading data from the FIFO, or if the reading rate diminishes below the capture rate, the FIFO 306 becomes full. A FIFO level signal, such as a half full or almost full signal, provides the request signal 318 to indicate to the sender whether the receiver is able to accept data. When the FIFO drains back to below this level by read operation performed by the processing element 300, the FIFO 306 then asserts the request signal to restart the flow of data into the FIFO.

The size of the FIFO 306 determines an amount of delay that is tolerable between the deassertion of a request signal and the deassertion of a valid data signal. The number of clock cycles of delay between assertion of the request signal and receipt of an asserted valid data signal includes propagation time of the request signal from the receiver to the sender, synchronization delay at the sender, and propagation delay of the valid data signal from the sender to the receiver. As a FIFO increases in size, so does the delay tolerance of the system. For example, if the time taken to stop the flow of data at the receiver is eight clock cycles from the time it deasserts the request signal, then the FIFO should contain at least eight free entries to avoid data loss because of a FIFO overflow. In one embodiment, the FIFO size may be sixteen levels with the request signal determined from the half full signal of the FIFO. For FIFOs with programmable flags, an almost full flag may be set at about eight locations or more from the end of the FIFO.

Figure 4B:
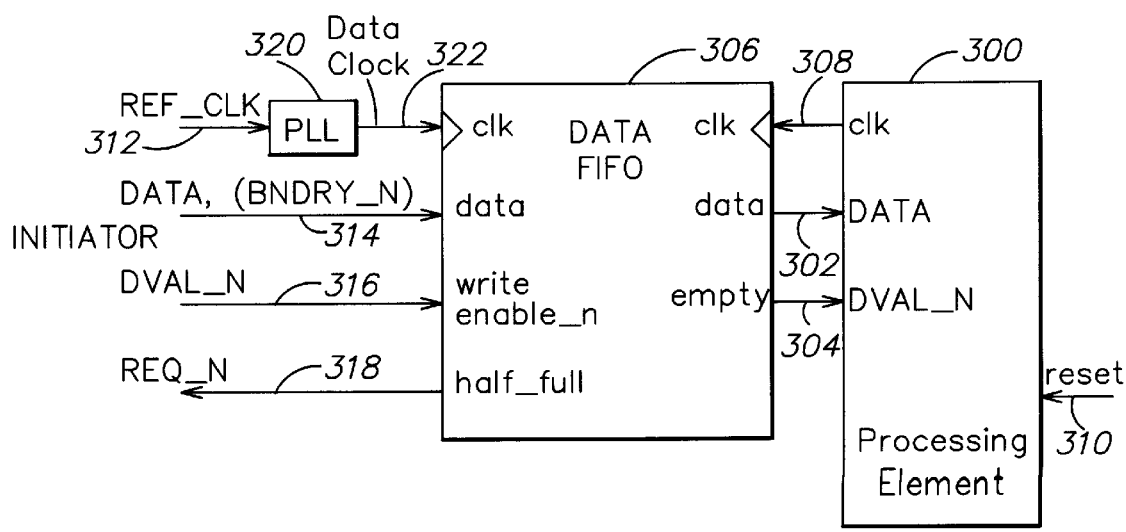

FIG. 4B illustrates a receiver for use with a sender such as shown in FIG. 3B. In this embodiment, which is generally the same as shown in FIG. 4A, the reference clock signal 312 is applied to a phase-lock loop 320 which in turn provides a data clock 322 which is applied to the write clock input of the FIFO 306.

Figure 4C:
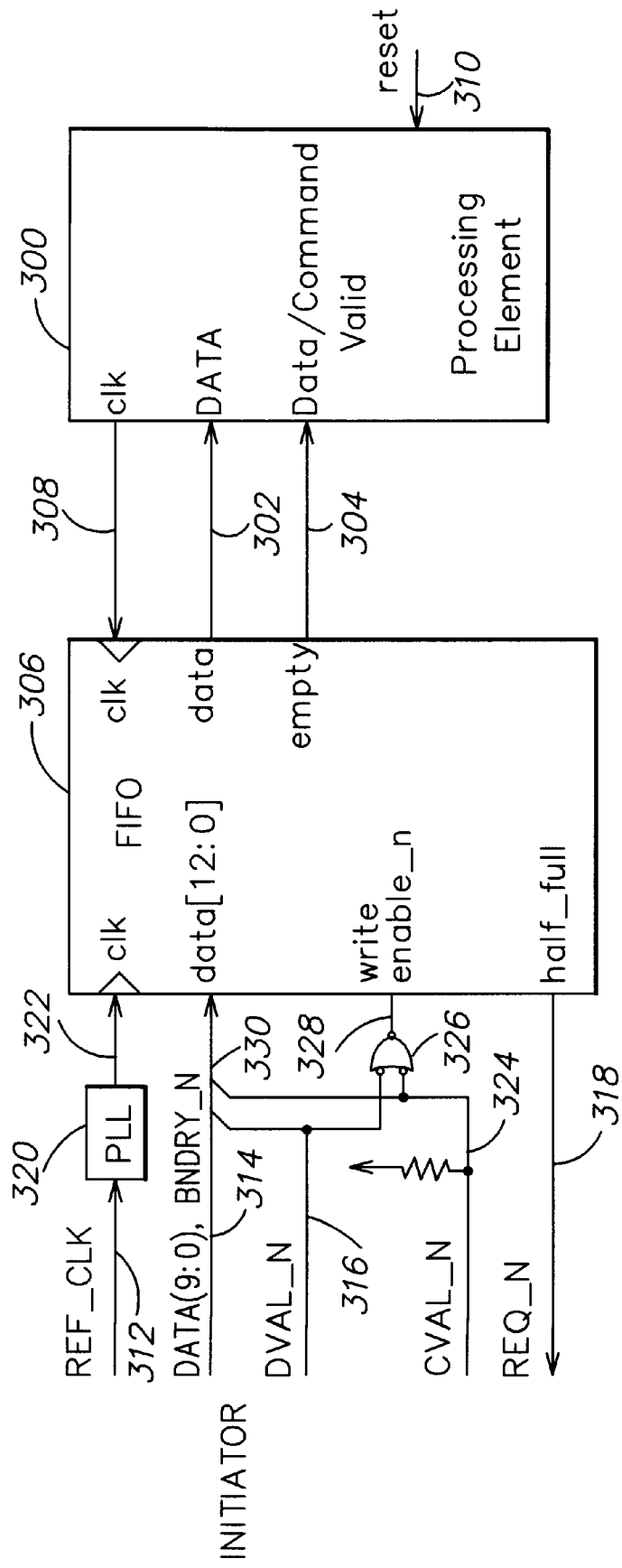

Referring now to FIG. 4C, the receiver handles receiving command data and a valid command signal 324. If either the valid data signal 316 or valid command signal 324 is active, the corresponding data 314 is captured in the FIFO 306. The data input to the FIFO as indicated at 330 is a combination of the data, and possibly any of the boundary signal, the valid data signal and the valid command signals, to allow the processing element 300 to determine what kind of data it is reading from the FIFO using the captured valid data and valid command signals. Alternatively, different data types may be captured in separate FIFOs. In this embodiment, the valid data signal 316 and the valid command signal 324 are applied to a logic gate 326 of which the output 328 controls the write enable input to the FIFO 306.

Figure 4D:
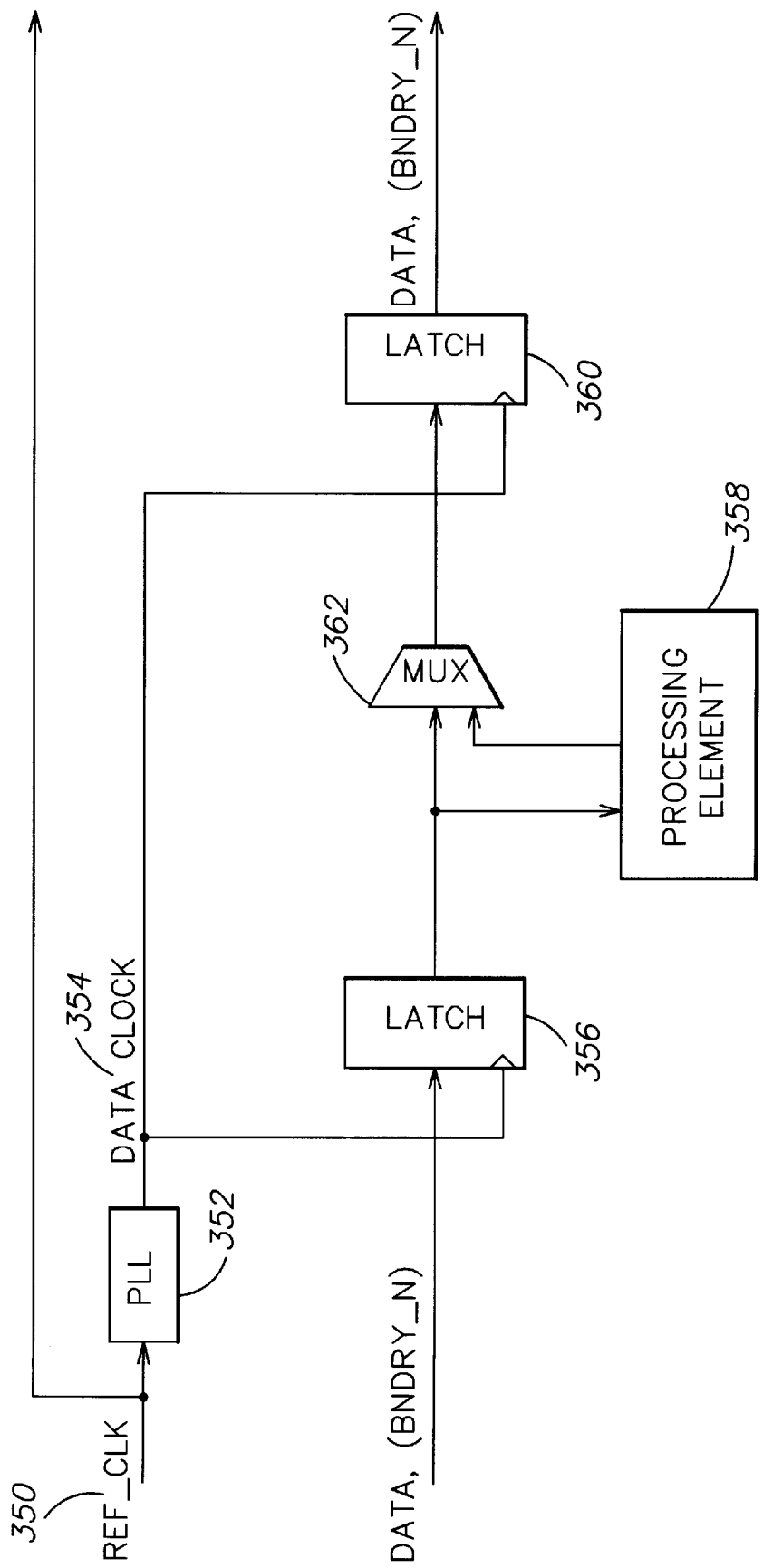

Referring now to FIG. 4D, a receiver may be modified by replacing the FIFOs such as FIFO 306 with registers. This embodiment is useful where many interconnected devices are concatenated in order to reduce the latency of data transmission from one end of the concatenated devices to the other. In the example shown in FIG. 4D, a constant flow application is shown, without a request signal, valid data signal, or valid command signals. In this embodiment, the reference clock signal 350 is applied to a phase-lock loop 352 to produce a data clock 354. A first set of registers 356 captures the data and boundary signals. This data may be provided to a processing element 358. The data from the processing element 358 or from the register 356 is input to a second set of registers 360 through a multiplexer 362. The second set of registers resynchronizes the data to the data clock and allows a full clock cycle for the processing element 358 to observe the data and process it.

In either of FIGS. 3B, 3C, 4B and 4C, where the PLL multiplier is not an integer, an alignment of the phase-lock loop generated data clock is established with respect to the reference clock. In order to perform this alignment, the sender and receiver perform a PLL initialization procedure upon reset. The reset signal 310 (FIGS. 4A–4C) in the receiver and reset signal 236 (FIGS. 3A–3C) in the sender are used for this purpose. The sender process will now be described in connection with FIG. 5. In this process, the system reset signal initiates this sender process when asserted in step 400. The sender then asserts a boundary signal for a minimum of one cycle of the reference clock in step 402. The sender maintains this signal asserted until a request signal from the receiver is received in step 404. The boundary signal is deasserted in step 406 coincident with the next rising edge of the reference clock after receipt of the request signal. The phase-lock loop is synchronized with the rising edge of the boundary signal in step 408. Similarly, the receiver receives a system reset signal in step 410 and waits for the boundary signal to be asserted by the sender in step 412. Upon receipt of the boundary signal, the receiver asserts the request signal in step 414. The phase-lock loop is then synchronized with the rising edge of the boundary signal in step 416.

Figure 7:
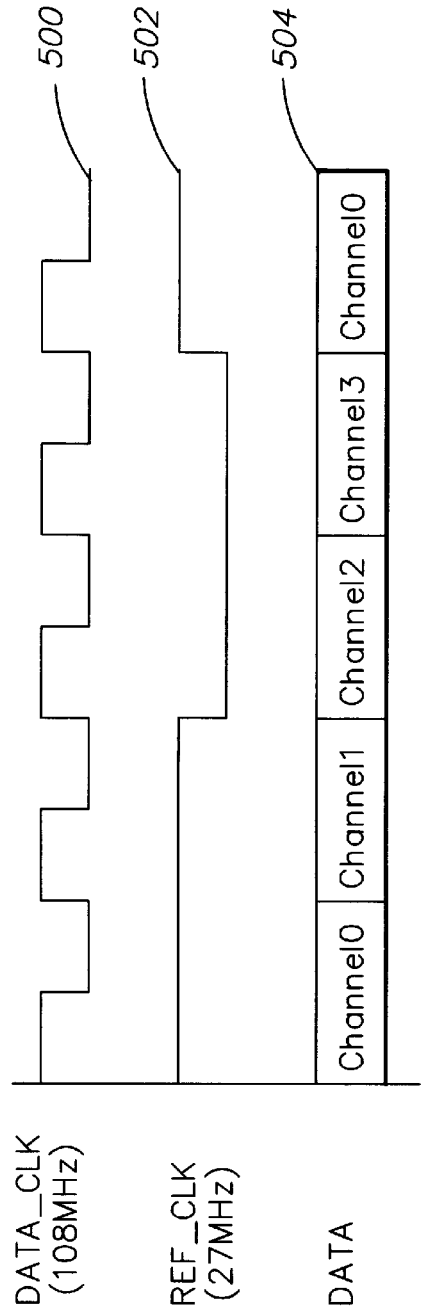
FIG. 7 is a timing diagram illustrating time division multiplexed channels on an interconnect.

When the data is transmitted over the interconnect at a rate higher than the reference clock, for example by using a PLL as described above, the number of data streams that transfer data over the interconnect may be increased by using time division multiplexing (TDM). The stream may use different transaction protocols (either constant or controlled flow). In order to perform such time division multiplexing, each cycle of the reference clock is divided into a number of "time slices." During each time slice a different stream of media may be transported across the data link. Each of these time slices is also referred to as a channel. FIG. 7 illustrates time division of the interconnect into four channels. In particular, the data clock 500 is operating at four times the rate of the reference clock 502. The data transport indicated at 504 assigns each cycle of the data clock 500 to a channel, labeled channel 0–3. In this embodiment, the bandwidth of any single channel is no greater than the frequency of the reference clock.

Figure 8:
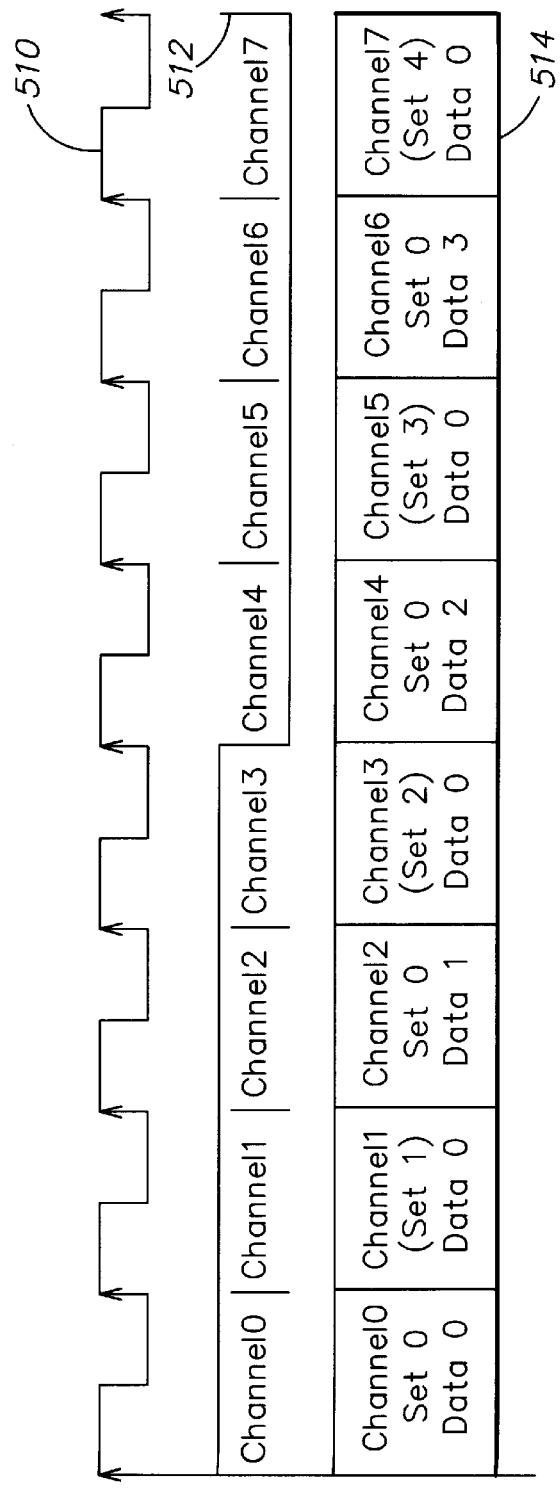
FIG. 8 is a timing diagram illustrating time division multiplexed channel sets.

Channels may be combined into channel sets, such as shown in FIG. 8. A channel set includes multiple channels that represent a single data stream. For example, in FIG. 8, the frequency of the data clock is shown at 510 is eight times the frequency of the reference clock at 512, thus providing eight channels. However, channels zero, two, four and six are combined into one channel set (set zero). This figure thus shows a five channel connection configuration. This assignment of channels is arbitrary, so long as the sender and receiver agree. In some applications, the channels of a set should be interleaved with other channels to preserve spatial and temporal relationships of the data.

A TDM channel protocol is independent of the connection protocol between devices. More particularly, the TDM channel connections are transparent to the constant and controlled flow protocols which are controlled by the handshake signals (the request signal, the valid data signal and the valid control signal). In other words, the TDM treats the handshake signals the same way as data, enabling each channel connection to be separate and independent of others. By convention, the rising edge of the reference clock may indicate the TDM channel zero. The channel numbers may be created by a simple binary counter operating at the data clock rate.

Figure 9:
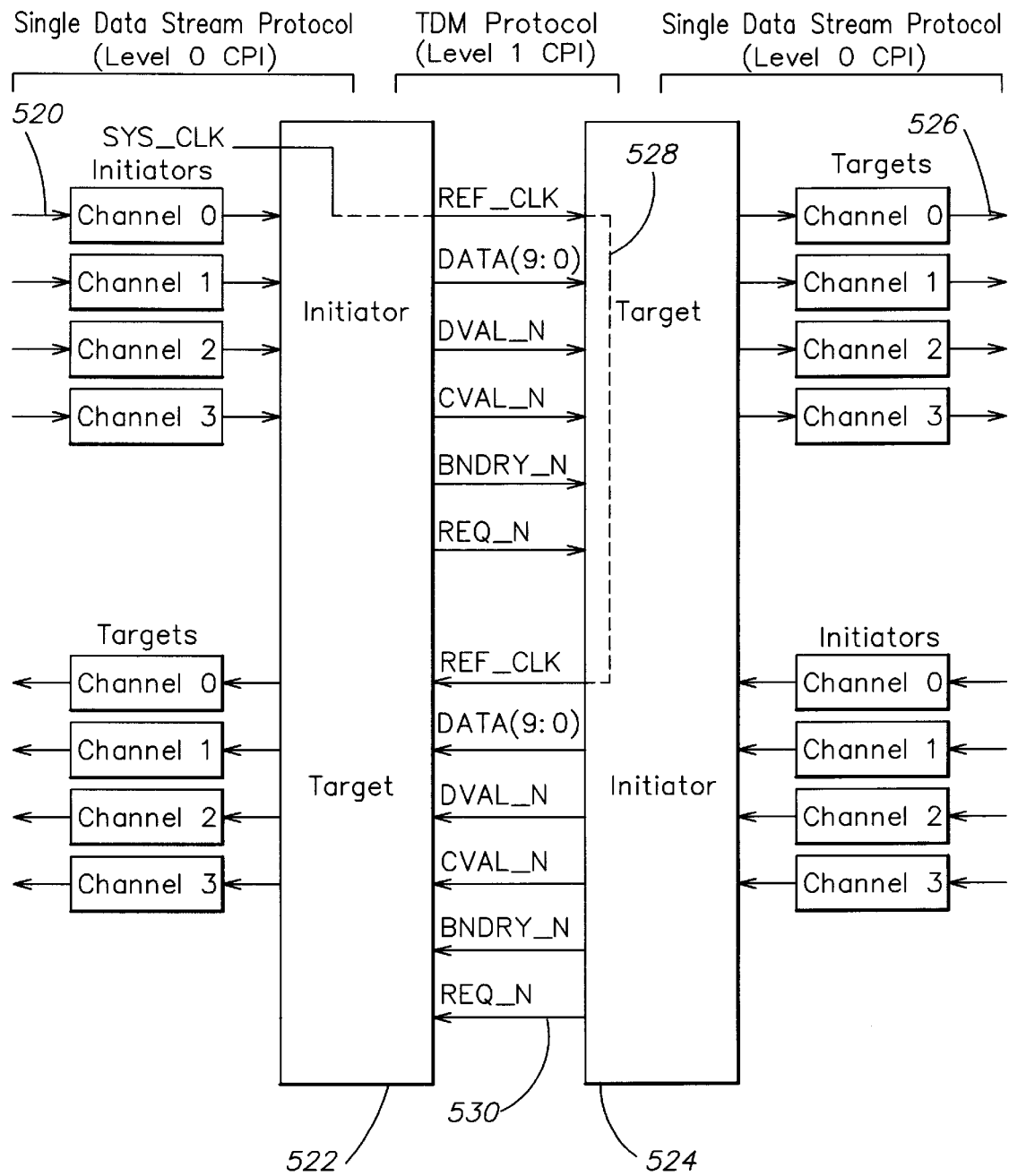
FIG. 9 is a block diagram of a multichannel time division multiplexed interconnection of devices.

FIG. 9 illustrates a bidirectional interface for transporting data of several channels over a time division multiplexed interconnect. In this device, each channel, e.g., 520 may communicate with a TDM initiator 522 using a single data stream protocol such as shown in FIGS. 3A and 4A. The initiator may receive data over such an interconnect from several channels. The TDM initiator sends the data from multiple channels over a time division multiplexed connection to a TDM target 524. The TDM target 524 then can communicate data to target channels, e.g., 526, over a single data stream protocol interconnect. With such time division multiplexing, the request signals from a receiver to a sender may be considered data transmitted from a target to an initiator. Accordingly, the request signal from a target is communicated over the TDM interconnect with its reference clock as shown at 528 and 530. Because the request signals also are time division multiplexed over the interconnect, they also demultiplexed at the sender and synchronized to a clock for each channel at the TDM initiator.

Figure 10:
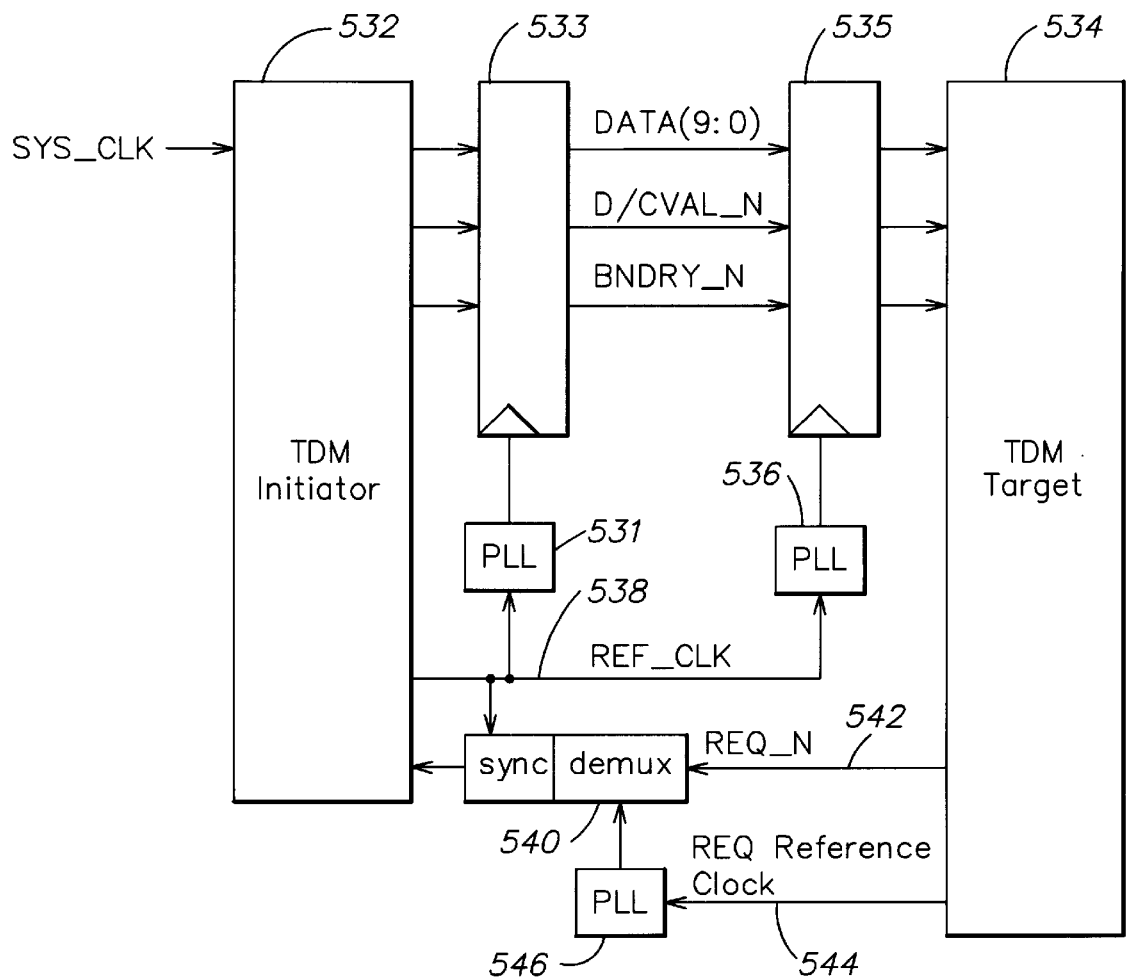
FIG. 10 is a block diagram illustrating a single time division multiplexed connection.
Figure 11:
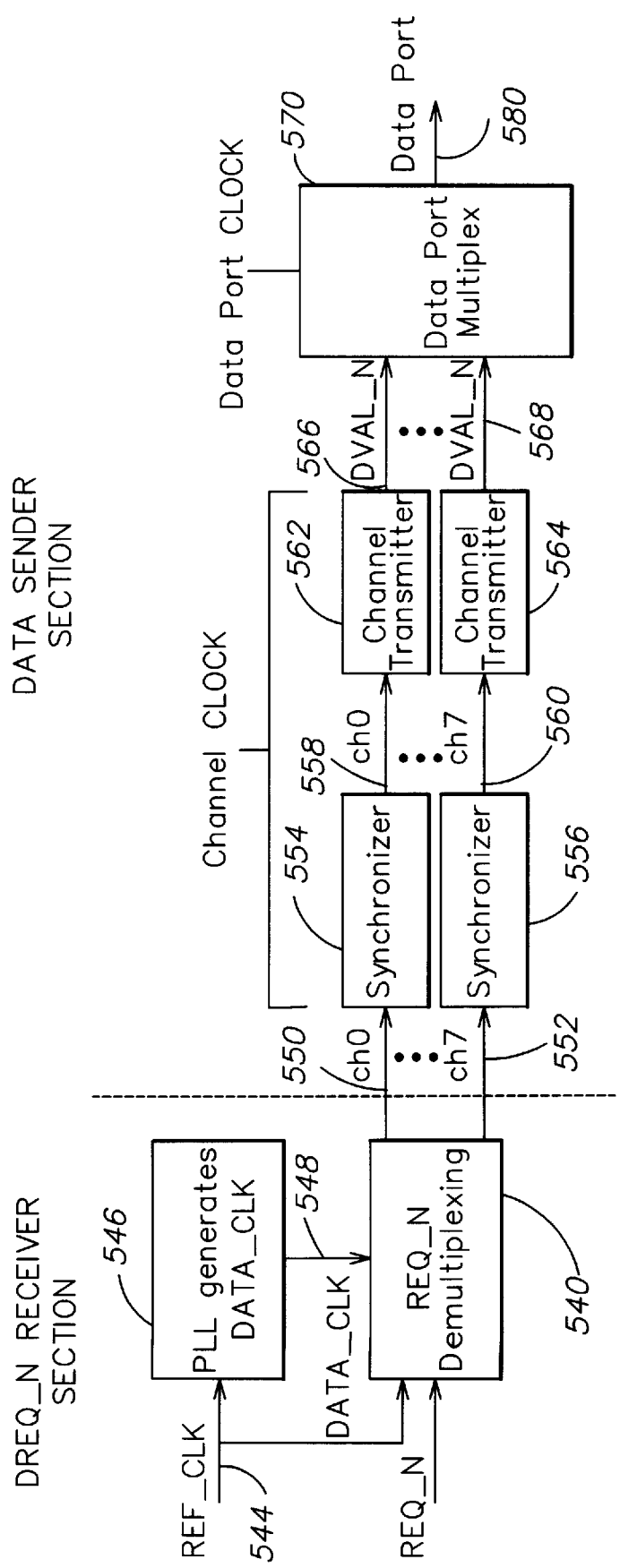
FIG. 11 is a more detailed block diagram of the request signal demultiplexer and synchronizer shown in FIG. 10.

FIG. 10 illustrates one embodiment of a single connection from a TDM initiator 532 to a TDM target 534. A full duplex connection may be provided by adding signals from the TDM target 534 to the TDM initiator 532 and a request signal from the TDM initiator 532 to the TDM target 534 and by adding a request signal demultiplexer to the TDM target 534. This block diagram is similar to FIGS. 3B and 4B above, by having latches 533 and 535 to communicate the data, valid data signal, valid command signal and boundary signal. These latches are controlled by phase-lock loops 531 and 536, which operate in response to the reference clock 538. This circuit also includes a demultiplexer 540 connected to receive the request signal 542. The reference clock from the target also is provided as indicated at 544. This reference clock is applied to a phase-lock loop 546. The phase-lock loop applies a signal to the demultiplexer 540 which selects the request signal from each channel. Each request signal is then synchronized. Such synchronization will now be described in connection with FIG. 11.

FIG. 1 shows more detail of the demultiplexing and synchronizing of the request signal. As shown in FIG. 10, a reference clock from the target 544 is received by a phase-lock loop 546 to output the high speed data clock as indicated at 548. The data clock is applied to a demultiplexing circuit 540 which receives the request signals over the TDM interface. The demultiplexer 540 outputs the request signal from each channel as indicated at 550 and 552. The reference for each channel operates a separate synchronizer 554 and 556 for the channel to provide its synchronized request signal as indicated at 558 and 560. This request signal is applied to the channel transmitter 562 and 564 which controls the output of the valid data signals 566 and 568. These valid data signals are input to the data port multiplexer 570 which in turn outputs the time division multiplexed data 580 over the time division multiplexed interconnect.

A delay lock loop (DLL) may be used where the sending and receiving reference clocks are the same. The receiver uses a DLL to adjust the sender's reference clock by observing the delay between the receiver's reference clock and the sender's reference clock. In this embodiment, the frequencies of the send and receive clocks are congruent in order to demultiplex the channel information at the receiver and to provide the device clocks.

On the TDM interconnect, command data may be used to control the input and output ports through which data flows through devices. The command data may be applied using a field advance counter such as shown in U.S. patent application Ser. No. 08/879,981 or may be embedded in the data transported over the interconnect. Such capability allows for dynamic configurations of video systems. Such dynamic configuration is described in more detail in U.S. Patent Application entitled "Method and Apparatus for Controlling Switching of Connections Among Data Processing Devices," filed Apr. 3, 1998, by Craig R. Frink, which is hereby incorporated by reference.

Using a flow control mechanism such as shown in the various embodiments above, interconnected processing elements may be data independent, i.e., the processing elements need not be designed for a fixed sample rate or resolution, sample format or other data-dependent factors. When used with digital motion video data, the processing elements may process motion video data at various temporal and spatial resolutions, color formats and precisions. Data processing by a particular processing element may occur at rates higher than the actual video rate. Systems may constructed using a variety of kinds of interconnects as described herein.

Command data transmitted over the interconnect enables processing elements to be dynamically configured. For example, the kinds of processing performed by a device may be changed. Processing device also may be used as switches. Interconnects also may provide random access to memory locations and devices rather than sequential access.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. An output interface for a sender of data, comprising:
   an output for providing a datum and a boundary signal indicating whether the datum defines a boundary of a sample of the data, a valid data signal associated and synchronous with a datum and indicating whether the associated datum is valid, and a reference clock signal and wherein the data is output by the output interface at a rate defined by the reference clock signal;
an input for providing a request signal from a receiver and asynchronous with the reference clock signal indicating a request for transfer of data from the sender; and
a controller that, after receipt of the request signal, directs data to the output and that asserts the valid data signal in association with the datum.

2. The output interface of claim 1, wherein the output comprises:
   data lines for carrying the datum;
   a boundary signal line for carrying the boundary signal; and
   a valid data signal line for carrying the valid data signal.

3. The output interface of claim 2, wherein the input comprises:
   a request signal line for carrying the request signal.

4. The output interface of claim 1, wherein the output further provides a valid command signal associated with a datum and indicating whether the associated datum is valid command data.

5. The output interface of claim 4, wherein the controller, after receipt of the request signal, directs command data to the output and asserts the valid command signal in association with the datum.

6. The output interface of claim 4, further comprising means for encoding packets of data using a combined state of the valid data signal and the valid command signal.

7. The output interface of claim 6, further comprising a phase-lock loop having an input for receiving the reference clock signal and an output for providing a clock signal having a rate higher than a rate of the reference clock signal and wherein the rate defined by the reference clock signal is the rate defined by the output of the phase-lock loop.

8. The output interface of claim 7, wherein the rate of the output of the phase-lock loop is a non-integer multiple of the rate of the reference clock signal, and the output interface further comprises means for synchronizing the phase-lock loop with a phase-lock loop in an input interface receiving the data from the output interface.

9. The output interface of claim 8, further comprising means for time division multiplexing data onto the output interface at the rate of the output of the phase-lock loop.

10. The output interface of claim 4, further comprising:
    a counting circuit having a first input for receiving a value to be loaded to provide an output, wherein the output indicates a number of samples of the output data for which the command data is valid, and control logic for tracking a number of samples processed by a processing element and for generating the control signal to the processing element after the processing element outputs the last sample for which the command data is valid.

11. The output interface of claim 1, further comprising a phase-lock loop having an input for receiving the reference clock signal and an output for providing a clock signal having a rate higher than a rate of the reference clock signal and wherein the rate defined by the reference clock signal is the rate defined by the output of the phase-lock loop.

12. The output interface of claim 11, wherein the rate of the output of the phase-lock loop is a non-integer multiple of the rate of the reference clock signal, and the output interface further comprises means for synchronizing the phase-lock loop with a phase-lock loop in an input interface receiving the data from the output interface.

13. The output interface of claim 12, further comprising means for time division multiplexing data onto the output interface at the rate of the output of the phase-lock loop.

14. An input interface for a receiver of data, comprising:
    an input for receiving from a sender a datum and a boundary signal indicating whether the datum defines a boundary of a sample of the data, a valid data signal associated and synchronous with a datum and indicating whether the associated datum is valid, and a reference clock signal;
    an output for providing a request signal asynchronous with the reference clock signal and indicating a request for transfer of data from the sender; and
    a controller that issues the request signal when the input interface is capable of receiving data and that reads the datum from the input when the valid data signal in asserted and at a rate defined by the reference clock signal.

15. The input interface of claim 14, wherein the input comprises:
    data lines for carrying the datum;
    a boundary signal line for carrying the boundary signal; and
    a valid data signal output line for carrying the valid data signal.

16. The input interface of claim 15, wherein the output comprises:
    a request signal line for carrying the request signal.

17. The input interface of claim 14, wherein the input further receives a valid command signal associated with a datum and indicating whether the associated datum is valid command data.

18. The input interface of claim 17, wherein the controller issues the request signal when the input interface is capable of receiving data and reads the command data from the input when the valid command signal is asserted.

19. The input interface of claim 17, further comprising means for decoding packets defined by a combined state of the valid data signal and the valid command signal.

20. The input interface of claim 19, further comprising
    a phase-lock loop having an input for receiving the reference clock signal and an output providing a clock signal having a rate higher than a rate of the reference clock signal and wherein the rate defined by the reference clock signal is the rate defined by the output of the phase-lock loop.

21. The input interface of claim 20, wherein the rate of the output of the phase-lock loop is a non-integer multiple of the rate of the reference clock signal, and the input interface further comprises means for synchronizing the phase-lock loop with a phase-lock loop in an output interface providing the data to the input interface.

22. The input interface of claim 21, further comprising means for demultiplexing time division multiplexed data on the input interface using the output of the phase-lock loop.

23. The input interface of claim 17, further comprising:
    a counting circuit having a first input for receiving a value to be loaded to provide an output, wherein the output indicates a number of samples of the received data for which the command data is valid, and control logic for tracking a number of samples processed by a processing element and for generating the control signal to the processing element after the processing element outputs the last sample for which the command data is valid.

24. The input interface of claim 14, further comprising
    a phase-lock loop having an input for receiving the reference clock signal and an output providing a clock signal having a rate higher than a rate of the reference clock signal and wherein the rate defined by the reference clock signal is the rate defined by the output of the phase-lock loop.

25. The input interface of claim 24, wherein the rate of the output of the phase-lock loop is a non-integer multiple of the rate of the reference clock signal, and the input interface further comprises means for synchronizing the phase-lock loop with a phase-lock loop in an output interface providing the data to the input interface.

26. The input interface of claim 25, further comprising means for demultiplexing time division multiplexed data on the input interface using the output of the phase-lock loop.

27. An output interface for a sender of data, comprising:
an output for providing a datum and a boundary signal indicating whether the datum defines a boundary of a sample of the data and a valid data signal associated with data and indicating whether the associated data is valid and a valid command signal associated with a command data and indicating whether the associated command data is valid command data;
an input for providing a request signal from a receiver indicating a request for transfer of data from the sender; and
a controller that transfers data with one of the valid data signal and the valid command signal asserted when a request signal is received.

28. An input interface for a receiver of data, comprising:
an input for receiving from a sender data and a boundary signal indicating whether the data defines a boundary of a sample of the data and a valid data signal associated with the data and indicating whether the data is valid and a valid command signal associated with the data and indicating whether the data is valid command data;
an output for providing a request signal indicating a request for transfer of data from the sender; and
a controller that issues the request signal when the input interface is capable of receiving data and that reads the datum from the input when one of the valid data signal and the valid command signal is asserted.

29. An output interface for a sender of data, comprising:
an output for providing a datum and a boundary signal indicating whether the datum defines a boundary of a sample of the data and a valid data signal associated with a datum and indicating whether the associated datum is valid;
an input for providing a request signal from a receiver indicating a request for transfer of data from the sender; and
a controller that, after receipt of the request signal, directs data to the output and that asserts the valid data signal in association with the datum, wherein the output further provides a valid command signal associated with a datum and indicating whether the associated datum is valid command data.

30. The output interface of claim 29, wherein the controller, after receipt of the request signal, directs command data to the output and asserts the valid command signal in association with the datum.

31. The output interface of claim 29, further comprising means for encoding packets of data using a combined state of the valid data signal and the valid command signal.

32. The output interface of claim 31, wherein the output further comprises a reference clock signal, wherein the data is output by the output interface at a rate defined by the reference clock signal, the output interface further comprising:
a phase-lock loop having an input for receiving the reference clock signal and an output providing a clock signal having a rate higher than a rate of the reference clock signal and wherein the rate defined by the reference clock signal is the rate defined by the output of the phase-lock loop.

33. The output interface of claim 32, wherein the rate of the output of the phase-lock loop is a non-integer multiple of the rate of the reference clock signal, and the output interface further comprises means for synchronizing the phase-lock loop with a phase-lock loop in an input interface receiving the data from the output interface.

34. The output interface of claim 33, further comprising means for time division multiplexing data onto the output interface at the rate of the output of the phase-lock loop.

35. The output interface of claim 29, further comprising:
a counting circuit having a first input for receiving a value to be loaded to provide an output, wherein the output indicates a number of samples of the output data for which the command data is valid, and control logic for tracking a number of samples processed by a processing element and for generating the control signal to the processing element after the processing element outputs the last sample for which the command data is valid.

36. An output interface for a sender of data, comprising:
an output for providing a datum and a boundary signal indicating whether the datum defines a boundary of a sample of the data, a valid data signal associated with a datum and indicating whether the associated datum is valid, and a reference clock signal and wherein the data is output by the output interface at a rate defined by the reference clock signal;
an input for providing a request signal from a receiver indicating a request for transfer of data from the sender;
a controller that, after receipt of the request signal, directs data to the output and that asserts the valid data signal in association with the datum; and
a phase-lock loop having an input for receiving the reference clock signal and an output providing a clock signal having a rate higher than a rate of the reference clock signal and wherein the rate defined by the reference clock signal is the rate defined by the output of the phase-lock loop.

37. The output interface of claim 36, wherein the rate of the output of the phase-lock loop is a non-integer multiple of the rate of the reference clock signal, and the output interface further comprises means for synchronizing the phase-lock loop with a phase-lock loop in an input interface receiving the data from the output interface.

38. The output interface of claim 37, further comprising means for time division multiplexing data onto the output interface at the rate of the output of the phase-lock loop.

39. An input interface for a receiver of data, comprising:
an input for receiving from a sender a datum and a boundary signal indicating whether the datum defines a boundary of a sample of the data and a valid data signal associated with a datum and indicating whether the associated datum is valid;
an output for providing a request signal indicating a request for transfer of data from the sender; and
a controller that issues the request signal when the input interface is capable of receiving data and that reads the datum from the input when the valid data signal in asserted wherein the input further receives a valid command signal associated with a datum and indicating whether the associated datum is valid command data.

40. The input interface of claim 39, wherein the controller issues the request signal when the input interface is capable of receiving data and reads the command data from the input when the valid command signal in asserted.

41. The input interface of claim 39, further comprising means for decoding packets defined by a combined state of the valid data signal and the valid command signal.

42. The input interface of claim 41, wherein the input further comprises a reference clock signal and wherein the controller reads data at a rate defined by the reference clock signal, the input interface further comprising:

a phase-lock loop having an input for receiving the reference clock signal and an output providing a clock signal having a rate higher than a rate of the reference clock signal and wherein the rate defined by the reference clock signal is the rate defined by the output of the phase-lock loop.

43. The input interface of claim 42, wherein the rate of the output of the phase-lock loop is a non-integer multiple of the rate of the reference clock signal, and the input interface further comprises means for synchronizing the phase-lock loop with a phase-lock loop in an output interface providing the data to the input interface.

44. The input interface of claim 43, further comprising means for demultiplexing time division multiplexed data on the input interface using the output of the phase-lock loop.

45. The input interface of claim 39, further comprising:

a counting circuit having a first input for receiving a value to be loaded to provide an output, wherein the output indicates a number of samples of the received data for which the command data is valid, and control logic for tracking a number of samples processed by a processing element and for generating the control signal to the processing element after the processing element outputs the last sample for which the command data is valid.

46. An input interface for a receiver of data, comprising:

an input for receiving from a sender a datum and a boundary signal indicating whether the datum defines a boundary of a sample of the data, a valid data signal associated with a datum and indicating whether the associated datum is valid, and a reference clock signal;

an output for providing a request signal indicating a request for transfer of data from the sender;

a controller that issues the request signal when the input interface is capable of receiving data and that reads the datum from the input when the valid data signal in asserted, wherein the data is read by the controller at a rate defined by the reference clock signal; and a phase-lock loop having an input for receiving the reference clock signal and an output providing a clock signal having a rate higher than a rate of the reference clock signal and wherein the rate defined by the reference clock signal is the rate defined by the output of the phase-lock loop.

47. The input interface of claim 46, wherein the rate of the output of the phase-lock loop is a non-integer multiple of the rate of the reference clock signal, and the input interface further comprises means for synchronizing the phase-lock loop with a phase-lock loop in an output interface providing the data to the input interface.

48. The input interface of claim 47, further comprising means for demultiplexing time division multiplexed data on the input interface using the output of the phase-lock loop.

* * * * *